Dec. 7, 1965 E. C. GARDNER 3,221,696
MECHANICAL COUPLINGS FOR MULTI-SECTION FLOATABLE ASSEMBLY
Filed April 1, 1963 2 Sheets-Sheet 1

ELMER C. GARDNER
INVENTOR.

BY Arnold & Roylance

Dec. 7, 1965   E. C. GARDNER   3,221,696
MECHANICAL COUPLINGS FOR MULTI-SECTION FLOATABLE ASSEMBLY
Filed April 1, 1963   2 Sheets-Sheet 2
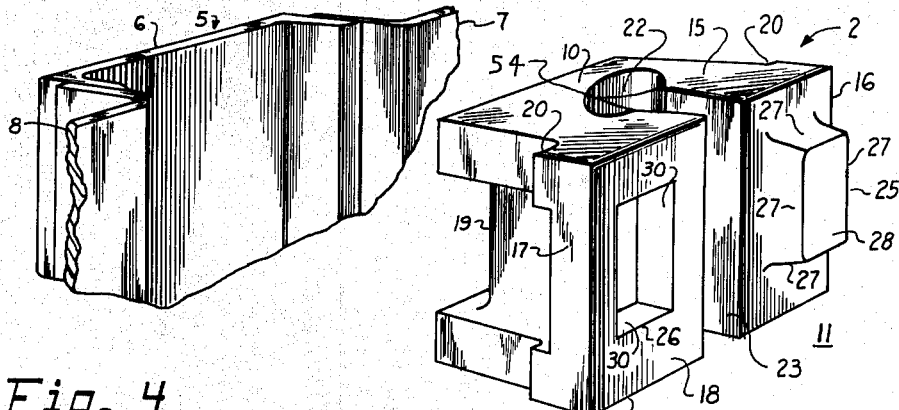
Fig. 4
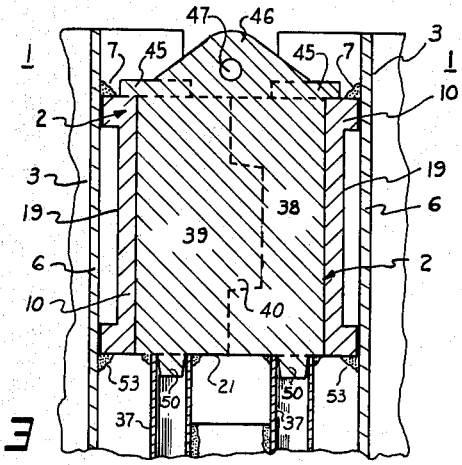
Fig. 3
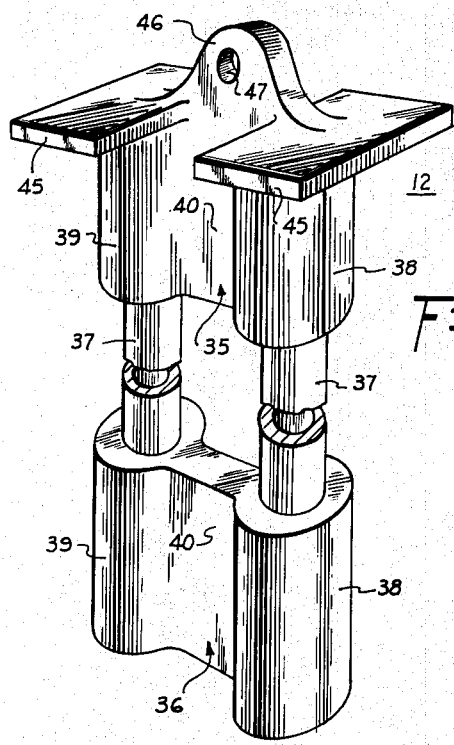
Fig. 5
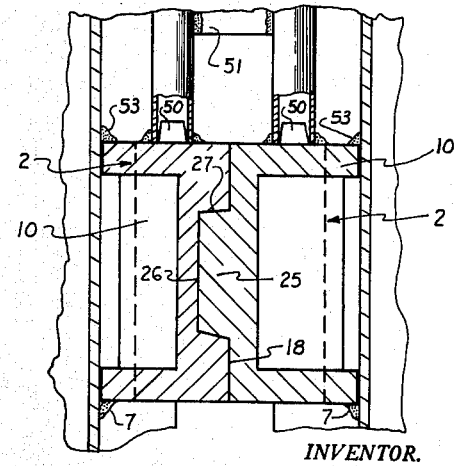
INVENTOR.
ELMER C. GARDNER
BY
Arnold & Roylance

United States Patent Office 3,221,696
Patented Dec. 7, 1965

3,221,696
MECHANICAL COUPLINGS FOR MULTI-SECTION
FLOATABLE ASSEMBLY
Elmer C. Gardner, 16 Westlane, Houston, Tex.
Filed Apr. 1, 1963, Ser. No. 269,466
9 Claims. (Cl. 114—43.5)

The present invention relates to the construction and arrangement of a multi-section floatable assembly, such as a barge, and, more particularly, to the mechanical couplings that connect the barge sections together.

It is a common practice in the construction of floatable assemblies to utilize a number of small floatable units, generally referred to hereinafter as pontoons, that are interconnected to form a rigid assembly. The pontoons weigh less and are easy to handle in the assembling and disassembling operation and make it convenient to change the size of the floatable assembly. The pontoons are interconnected by means of mechanical couplings, which is the subject of the present invention, by maneuvering the pontoons into position where the couplings are made fast.

Frequently a particular pontoon may become damaged and need replacement. A new pontoon may be substituted by merely disconnecting the couplings to the adjacent pontoons.

Examples of several such floatable assemblies are described in United States Patents 2,605,733 (barge), issued to W. W. Smith, August 5, 1962; 2,728,319 (dry dock), issued to G. C. Engstrand, December 27, 1955; and 2,847,961 (dredge hull), issued to J. W. Meckenstock, August 19, 1958.

Notwithstanding the advancements brought about by the above-mentioned patents, the need remains for an improvement in the couplings for the pontoons. The couplings provide the required structural rigidity for the floatable assembly and must, in many cases, undergo severe stresses while the floatable assembly is in use.

Another important consideration is interchangeability of the pontoons. Also, the attachment of the couplings to a pontoon should require only a minimum amount of modification and should not involve a complicated locking arrangement between couplings which is susceptible to frequent malfunctions.

Accordingly, it is an object of the present invention to provide an improved mechanical coupling for connecting pontoons of a floatable assembly, as well as connecting accessory items such as bits, spuds, engines, etc.

Another object of the present invention is to provide a mechanical coupling that permits interchanging pontoons and accessories without having to stock a number of pontoons with different arrangements and types of couplings.

It is a further object of the present invention to provide a small and high strength mechanical coupling that maintains a rigid connection between pontoons, preventing separate movement in any direction.

It is a further object of the present invention to provide a mechanical coupling for pontoons that is convenient and easy to connect and detach.

Other objects and advantages of the present invention will become apparent from the following description.

In accordance with the present invention, one embodiment of the mechanical coupling can be briefly described as comprising a block having a rear face adaptable for attachment to the side of a floatable structure. The block has opposite side faces, upper and lower faces, and an outer face for confronting a mating coupling block secured to another floatable structure. The outer block face has guide means that receives a guide means on the mating coupling member to align the mating blocks and prevent relative movement of the mating blocks in the lateral direction, either vertically or horizontally, when the mating blocks are in abutting relationship. The block has a recess opening to the outer face, extending from the upper block face. A connecting member having an end configuration that matches the block recess configuration is inserted in the block recess of the mating blocks when the mating blocks are in abutting relationship. The connecting member can extend through the block recesses to couple together another pair of mating blocks disposed adjacent the first mentioned pair of blocks.

In connection with description of the arrangement of a preferred embodiment of the present invention, reference is made to the drawings, wherein:

FIG. 3 shows two pairs of couplings in assembled relationship. The upper portion of FIG. 3 is an elevation view in cross-section along the lines 3—3 of FIG. 1, through the blocks and connecting member; the lower portion of FIG. 3 is an elevation view in cross-section along the lines 3—3 of FIG. 1, through the blocks, pin and recess.

FIG. 4 is a perspective view showing one form of mounting bracket and coupling block of the present invention;

FIG. 6 is a horizontal cross-section through two joined couplings of a modified form, in accordance with the present invention.

Before commencing with the detail description of a preferred embodiment of the present invention, it must be realized that the mechanical couplings described herein have equal application to many types of floatable units and accessories. Such uses include the assembly of dredge hulls, barges and dry docks, spuds, bits and cleats, and power driving units. The selection of the term "pontoon" to identify the basic unit of the floatable assembly is merely for convenience in representing the numerous types of members that can be arranged to form a floatable assembly.

Figure 1:
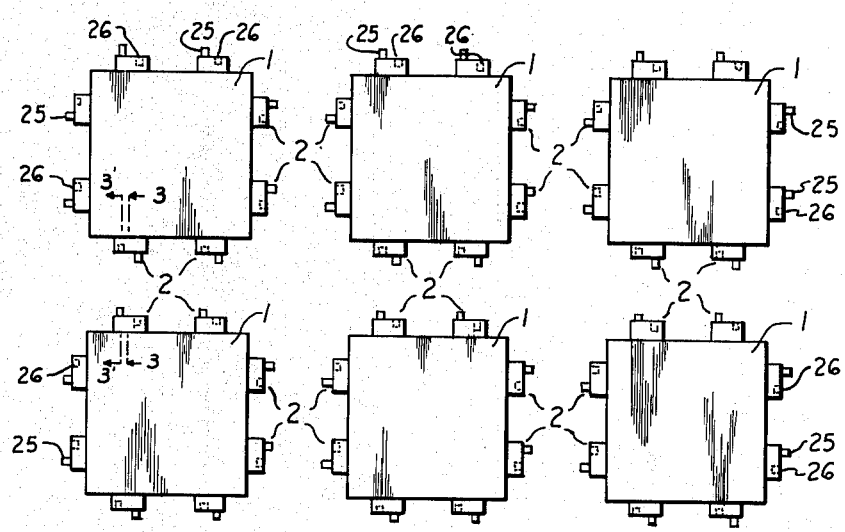
FIG. 1 is a plan view in schematic form of the arrangement of a number of pontoons that are connected together by means of one embodiment of the coupling of the present invention.

With particular reference to FIG. 1 of the drawings, the preferred embodiment of the present invention in its general form includes a number of cube shaped pontoons 1 that are interconnected by means of couplings 2 attached to the pontoon side 3 (FIG. 4). Each pontoon side 3 has couplings 2 attached thereto. The number of couplings used depends on the size and type of pontoon and the purpose for the floatable assembly. In the illustrated embodiments of FIG. 1, two couplings on each side 3 are disposed in the same horizontal plane with two of the couplings on each of the other sides and each are spaced apart on the respective pontoon side 3. Two other couplings 2 on each side 3 are disposed in vertical alignment below the respective first mentioned couplings, and lie in another horizontal plane spaced from the first mentioned plane.

The couplings 2 are identical in construction and are placed in the same position on all sides 3 in such a way that the pontoons are interchangeable, as will be explained hereinafter.

The couplings 2 may be attached to pontoon sides 3, such as by welding directly to a metal pontoon housing, or the pontoon sides 3 may be slightly modified to permit recess mounting of the couplings 2 to bring the pontoon 1 closer together. The recess mounting of the couplings 2 may be accomplished in many ways, such as forming a recess in the pontoon side 3 that receives a mounting bracket 5 having a back U-shaped bracket 6 with L-shaped members 7 and 8 secured to the legs of the U-shaped member 6. L-shaped members 7 and 8 each have an arm extending along the pontoon side 3. A number of couplings 2 may be secured to the mounting bracket 5 by suitable fastening means, such as welds 53, as illustrated in FIG. 3. The mounting brackets 5 are disposed in vertical alignment on the pontoon side 3 and spaced thereon to dispose the couplings 2 in vertical alignment and in identical vertical and horizontal spacing on each pontoon side 3.

Figure 5:
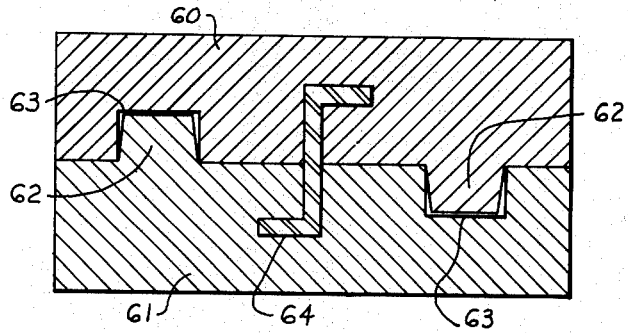
FIG. 5 is a perspective view showing one embodiment of the connecting member in accordance with the present invention.

The coupling 2, as best illustrated in FIG. 4, generally comprises a block 10 having guide means 11 that provides the alignment of the mating couplings 2. Block 10 is arranged to receive a locking means 12 (FIG. 5) that rigidly joins the couplings 2 to form the unified floatable assembly.

The block 10 may be formed from a single casting and is constructed of a strong material, such as cast iron. Block 10 comprises a flat upper face 15, flat lower face 21, side faces 16 and 17, a substantially flat outer face 18, and a rear face 19. As mentioned previously, the rear portion of the block 10 snugly fits in between the legs of the U-shaped bracket 6 to bring the shoulder 20 of side faces 16 and 17 into abutting engagement with the outer arm faces of the L-shaped members 7 and 8.

In the approximate center of block 10, an elliptically shaped passage or slot 22 extends between the upper block face 15 and the lower block face 21. The passage or slot 22 opens to the block outer face 18 from the upper block face 15 to the lower block face 21 through a channel 23 of smaller horizontal width than the major diameter of the passage 22 to form a locking shoulders 54.

The guide means 11 for block 10 includes pin 25 and groove 26 disposed on opposite sides of channel 23 on the block outer face 18. Pin 25 is essentially rectangular in shape and projects outwardly at right angles from the block outer face 18 and has side faces 27 that taper inwardly toward the end face 28 of pin 25. Groove 26 has side faces 30 that match the taper of pin side faces 27 and is capable of receiving a pin 25 from a mating coupling 2 in tight relationship when the outer faces 18 of the mating couplings 2 are in abutting engagement. Obviously, the two mating couplings 2 are brought into face-wise engagement with the positions of the pin 25 and groove 26 reversed for one of the couplings 2, as illustrated in FIG. 1, so that the pin 25 of the first coupling 2 will be received in the groove 26 of the second coupling 2 and the groove 26 of the first coupling will receive the pin 25 of the second coupling 2. In this engaged position, the guide means 11, in the form of the grooves 26 and pins 25, serves to align the mating couplings 2 so that the channels 23 are in perfect alignment forming a continuous channel between the respective passages or slots 22 of the two couplings 2. The lower portion of FIG. 3 illustrates the aforementioned engaged relationship of two couplings in accordance with the present invention, since it is an elevation, cross-sectional view through the couplings 2 at the location of the engaging pin 25 and groove 26.

The mating couplings 2 are rigidly held together by means of a locking means 12 having connecting members 35 and 36 held in spaced apart relationship by means of struts 37. Connecting member 35 has opposite ends 38 and 39 having an elliptical configuration slightly smaller in size than the block passage or slot 22. Connecting member ends 38 and 39 are joined by an intermediate member 40 having a width that is slightly smaller than the horizontal width of channel 23 and smaller than the major diameter of the connecting member ends 38 and 39. The connecting member ends 38 and 39 engage locking shoulders 54 and prevent withdrawal of the connecting members 35 and 36 towards a mating coupling. In other words, each of the connecting members 35 and 36 has a shape generally resembling a dog bone and is of such a configuration to fit closely within the passages or slots 22, locking shoulders 54, and channels 23 of engaged mating couplings 2, and keep the mating couplings from pulling apart. Other configurations can be used for the connecting member end and an intermediate member 40 as long as there is a locking engagement of the connector member end in each mating coupling block. FIG. 6 illustrates another form of connecting member, as will be described hereinafter.

The upper connecting member 35 is used to interconnect one pair of mating couplings 2, and the lower connecting member 36 interconnects a second pair of mating couplings 2 that are disposed below the first mentioned couplings in vertical alignment. The passages or slots 22 and channels 23 are in alignment and receive the locking means 12.

The size of connecting members 35 and 36, and passage or slot 22 of the upper coupling 2 can be somewhat larger than the connecting members 38 and 39 and passage or slot 22 of the lower coupling 2, respectively, in order to permit closer fitting of mating connection ends 38 and 39 and intermediate member 40, while improving the ease of inserting locking means 12.

A retaining plate 45 is secured to the top of the connecting member 35 and extends transversely thereof to overlie the block upper face 15, thereby preventing the locking means 12 from falling through the couplings 2. A suitable handle 46 is also attached at the upper end of connecting member 35 to insert and withdraw the locking means 12. A grappling hook attached to a hoist (not shown) may be inserted in aperture 47 of the handle 46 to aid in removing the locking means 12, if necessary.

The upper portion of FIG. 3 illustrates the engagement of the locking means 12 with mating couplings 2, since the cross-sectional elevation view is taken directly through the center of the connecting member 35 between the adjacent pontoon sides 3.

Struts 37 suspend the connecting member 36 from connecting member 35 and can be attached by any suitable means. FIG. 3 illustrates an arrangement wherein the struts 37 are hollow and surround an abutment 50 and are welded at each end. The struts 37 may be of considerable length, depending on the spacing of adjacent couplings 2 on the pontoon side 3. To assist in keeping the struts 37 rigid, a tubular brace 51 may be secured between the struts 37 to prevent buckling.

FIG. 6 illustrates a modification of the form of locking means 12 wherein the couplings 60 and 61 have pins 62 and recesses 63 in the same manner as the embodiment of FIGS. 1 through 5. The locking means includes a Z-shaped connecting member 64 that fits into L-shaped recesses in the engaging couplings 60 and 61. The Z-shaped connecting member does not have as convenient an engaging manner and load distribution as the bone-shaped connecting member illustrated in the embodiment of FIGS. 1 through 5.

Figure 2:
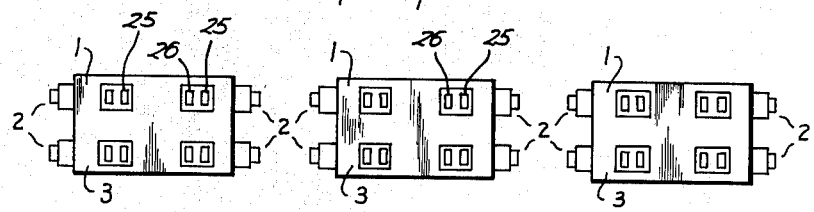
FIG. 2 is an elevation view of the arrangement shown in FIG. 1, illustrating the pontoons just before connection to form a floatable assembly.

With the construction details of one embodiment of the couplings having been described, the steps for putting together a floatable assembly are quite apparent. As mentioned previously, each pontoon 1 is equipped with the couplings 2 identically positioned on each pontoon side 3, as illustrated in FIGS. 1 and 2. As each side 3 is viewed from the front (FIG. 2), the pins 25 are to the right and the grooves 26 are to the left on each coupling. In this manner any side 3 of any shaped pontoon with similarly spaced couplings 2 can be joined. Also, the pontoons 1 can be joined to form a staircase type assembly, connecting only one set of connectors on facing pontoon sides 3.

Assuming that the pontoons 1 are in the form of a watertight housing with the couplings 2 attached to the sides as described, each pontoon 1 is floated into position and the mating couplings 2 are brought into engagement as illustrated in FIG. 3. The guide means 11 in the form of pins 25 and grooves 26 align the couplings 2 and also prevent lateral movement, either horizontal or vertical. The locking means 12 is then inserted with the connecting member 36 dropping through the upper coupling 2 and engaging in block passage or slot 22 and channel 23 of the lower engaging couplings, while the connecting member 35 rests in the passage or slot 22 and channel 23 of the upper engaging couplings 2.

Consequently, a simple and highly rugged connection is established between the pontoons 1 providing a rigid floatable assembly that can be conveniently added to or separated as the occasion demands. Each of the couplings is identical in construction and size, differing only in position and orientation of the guide means, and a single type of locking means is used for all of the couplings 2.

While only two embodiments of the present invention have been illustrated in the specification, it is obvious that modifications of the couplings and coupling arrangement can be made in line with the teachings of the present invention. The scope of patentable invention is not to be limited to the specific embodiments shown herein and is to be derived from the claims appended hereto.

What is claimed is:

1. A coupling for securing together floatable structures and the like to provide a rigid and easily separable assembly, comprising
   a block of strong material having a rear face adaptable for attachment to the side of a floatable structure,
     said block having opposite side faces, upper and lower faces, and on outer face for confronting a mating coupling block secured to another floatable structure,
     said outer block face having guide means that receives guide means on the mating coupling to align the mating blocks and prevent relative movement of the mating blocks in the lateral direction, either vertical or horizontal, when the mating blocks are in abutting relationship,
     said block having a passage opening to said outer face, extending from the upper to the lower block face,
   an elongated connecting member having an end configuration that matches the block recess configuration and permits said connecting member end to be inserted into said block recess and prevents disengagement of said connecting member by pulling towards the mating block when the mating blocks are in abutting relationship,
     said guide means comprising a pin and groove spaced on opposite sides of said passage opening on said block outer face to receive a mating pin and groove on the mating block so that the outer faces of the mating blocks can be brought together in abutting relationship before inserting said elongated member that connects the mating blocks together.

2. A coupling, as described in claim 1, wherein,
   said block passage extends through to the lower face of said block;
   said connecting member is insertable from the upper face of said block into said passage and has a retainer that extends over the upper face of said blocks to prevent said connecting member from falling through;
   said connecting member having an end configuration that prevents movement in the direction of the mating coupling block when inserted in said block passage;
   said connecting member having a portion that extends through said block and out the lower end for engaging another pair of mating blocks adjacent said block.

3. A coupling assembly for the alignment and rigid securement of a first and second item, comprising
   a first block having a top surface, a bottom surface, and a front surface secured to the first item, including
     a first projection from said first block,
     a first recess in said first block adapted to receive a projection substantially equal in dimension and configuration to said first projection, and
     a first groove in said first block opening into said front surface and extending in substantial uniform dimension from said top surface to said bottom surface,
       said first groove becoming larger at a distance spaced from said front surface,
   a second block secured to the second item, including
     a second projection from said second block of substantially the same dimension and configuration as said first projection and positioned so as to mate with said first recess,
     a second recess in said second block of substantially the same dimension and configuration as said first recess and positioned so as to mate with said first projection, and
     a second groove in said second block opening into its front surface of substantially the same dimension and configuration as said first groove and positioned so as to be contiguous with said first groove when said first and second blocks are joined, and
   a symmetrical locking means joining said first and second blocks, including
     a first member for fitting snugly into the enlarged portion of said first groove,
     a second member for fitting snugly into the enlarged portion of said second groove,
     a web member of suitable dimension for passing through the narrowest opening dimension of said first and second grooves for connecting together said first and second member, and
     limit means for positioning said locking means in said first and second blocks in the desired location.

4. A coupling assembly for the alignment and rigid securement of a first and second item, comprising
   a first pair of blocks, each block having a top surface, a bottom surface, and a front surface and each secured to the first item, including
     a first projection from each of said first blocks,
     a first recess in each of said first blocks adapted to receive a projection substantially equal in dimension and configuration to said first projection, and
     a first groove in each of said first blocks opening into said front surface and extending in substantial uniform dimension from said top surface to said bottom surface,
       said first groove becoming larger at a distance spaced from said front surface,
   a second pair of blocks, each block secured to the second item, including
     a second projection from each of said second blocks of substantially the same dimension and configuration as said first projection and positioned so as to mate with said first recess,
     a second recess in each of said second blocks, of substantially the same dimension and configuration as said first recess and positioned so as to mate with said first projection, and
     a second groove in each of said second blocks, opening into its front surface of substantially the same dimension and configuration as said first groove and positioned so as to be contiguous with said first groove when said first and second pair of blocks are joined, and
   a symmetrical locking means joining said first and second pair of blocks, including
     a first member for fitting snugly into the enlarged portion of said first groove in the first block of said first pair, a second member for fitting snugly into the enlarged portion of said second groove in the first block of said second pair, a first web member of suitable dimension for passing through the narrowest opening of said first groove in said first block of said first pair and said second groove in said first block of said second pair for connecting together said first and second members, a third member for fitting snugly into the enlarged portion of said first groove in the second block of said first pair, a fourth member for fitting snugly into the enlarged portion of said second groove in the second block of said second pair, a second web member of suitable dimension for passing through the narrowest opening of said first groove in said second block of said first pair and said second groove in said second block of said second pair for connecting together said third and fourth members, an assembly for joining said first and second members to said third and fourth members, and limit means for positioning said locking means in said first and second pair of blocks in the desired location.

5. A coupling assembly in accordance with claim 4, wherein said assembly in said symmetrical locking means includes a first strut connecting said first member to said third member, and a second strut connecting said second member to said fourth member.

6. An assembly of floatable housings arranged to form a unitary hull, comprising at least two housings, one having a face in confronting relation with a face of the other housing, a first connecting means attached to said faces of said housings to rigidly hold said housings together, said connecting means having at least a first and second separable part with confronting end faces, the first of said separable parts being attached to a face of one of said housings, the second of said separable parts being attached to a face of the other of said housings, each of said end faces having a guide pin and mating groove for aligning said parts, each of said parts having a slot for receiving a locking member, said connecting means including a locking member separable from said parts for fastening said separable parts together, said locking member having ends that fit into said slots and prevent separation of said parts, a second connecting means attached to said faces of said housings similar to said first connecting means and arranged to receive said locking member for convenient joining and separation of said housings.

7. An assembly in accordance with claim 6, wherein said slots in each of said parts of said first connecting means is larger than said slots in each of said parts of said second connecting means for ease of joining and separating said housings.

8. An assembly in accordance with claim 6, wherein said locking member includes an enlarged end suitable for fitting said slots of said parts of said first connecting means and an end suitable for fitting said slots of said parts of said second connecting means for ensuring setting of said locking member.

9. In a combination of pontoons arranged to form substantially rigid floatable structure having an upper surface and joined pontoon sides, the improvement of first couplings secured to confronting sides of said pontoons, each of said couplings comprising a block attached to a pontoon side and having an outer face for confronting the outer face of a mating coupling block attached to another pontoon and having universal guide means for aligning said coupling with a mating coupling when said pontoons are brought together, said guide means comprising a pin and mating groove arrangement on said block outer face and said mating coupling outer block face, a locking means attached to said mating couplings to prevent separation of said mating couplings, said locking means comprising an elongated member, said coupling blocks having means for fastening an end of said elongated member to secure mating couplings together and form a rigid, floatable structure, said fastening means comprising a slot in the block outer face that receives one end of said elongated member and extending to opposite faces of said blocks, said slot and the end of said elongated member being of such configuration that the elongated member cannot be withdrawn from the slot in the direction of the mating coupling, and second couplings attached to each of the joined pontoon sides similar to said first couplings, at least two of the blocks on one pontoon side face having their slots in alignment to receive said elongated member that secures the two pairs of mating couplings together.

References Cited by the Examiner

UNITED STATES PATENTS

| 1,207,504 | 12/1916 | Converse | 46—25 |
| 2,225,612 | 12/1940 | Allen | 46—26 X |
| 2,319,147 | 5/1943 | Mason | 46—25 X |
| 2,649,803 | 8/1953 | Andre | 46—25 |
| 2,876,726 | 3/1959 | Robishaw | 114—.5 |
| 3,139,698 | 7/1964 | Arnold | 46—25 |

MILTON BUCHLER, *Primary Examiner.*

FERGUS S. MIDDLETON, *Examiner.*